(12) United States Patent
Bott et al.

(10) Patent No.: US 12,139,138 B2
(45) Date of Patent: Nov. 12, 2024

(54) METHOD FOR LIMITING A DRIVING SPEED OF A VEHICLE WHEN DRIVING AROUND A BEND

(71) Applicant: MERCEDES-BENZ GROUP AG, Stuttgart (DE)

(72) Inventors: Thiemo Bott, Schönaich (DE); Daniel Görke, Leinfelden-Echterdingen (DE); Philipp Knödler, Waldstetten (DE); Wolfgang Raab, Gerlingen (DE); Matthias Schlutter, Weil im Schönbuch (DE); Stephanie Streiter, Böblingen (DE); Annette Sylla, Grafenau (DE); Ruben Voigtländer, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/292,394

(22) PCT Filed: Jun. 22, 2022

(86) PCT No.: PCT/EP2022/067043
§ 371 (c)(1),
(2) Date: Jan. 26, 2024

(87) PCT Pub. No.: WO2023/006306
PCT Pub. Date: Feb. 2, 2023

(65) Prior Publication Data
US 2024/0278779 A1    Aug. 22, 2024

(30) Foreign Application Priority Data
Jul. 27, 2021  (DE) .................... 10 2021 003 873.8

(51) Int. Cl.
*B60W 30/14*    (2006.01)
*B60W 30/18*    (2012.01)
*B60W 50/00*    (2006.01)

(52) U.S. Cl.
CPC .... *B60W 30/146* (2013.01); *B60W 30/18145* (2013.01); *B60W 2050/0026* (2013.01);
(Continued)

(58) Field of Classification Search
CPC ......... B60W 30/146; B60W 30/18145; B60W 2552/20; B60W 2556/40; B60W 2050/0026; B60W 2720/10
See application file for complete search history.

(56) References Cited

U.S. PATENT DOCUMENTS 6,141,617 A    10/2000    Matsuda et al.
6,212,465 B1    4/2001    Sielagoski et al.
(Continued)

FOREIGN PATENT DOCUMENTS

AT    520320 A4    3/2019
DE    19816133 A1    10/1998
(Continued)

OTHER PUBLICATIONS

International Search Report and Written Opinion mailed Nov. 24, 2022 in related/corresponding International Application No. PCT/EP2022/067043.
(Continued)

*Primary Examiner* — Peter D Nolan
*Assistant Examiner* — Wae L Louie
(74) *Attorney, Agent, or Firm* — PATENT PORTFOLIO BUILDERS PLLC

(57) ABSTRACT

A driving speed of a vehicle is limited when driving around a bend. A course of a curve of a route portion lying ahead of the vehicle is determined using a digital map. Depending on
(Continued)

the course of the curve and on physical load limits of the vehicle, a course of a permissible bend speed is determined. The vehicle is controlled such that the determined permissible bend speeds are not exceeded when driving around the bend. By evaluating the course of the curve, a route portion, in which the curve is greater than a pre-determined curve limit value, is identified as a bend portion. Local curve maxima are identified in the identified bend portion. A permissible bend speed is determined for each local curve maximum depending on the curve and on a permissible lateral acceleration.

10 Claims, 3 Drawing Sheets

(52) U.S. Cl.
CPC ..... *B60W 2552/20* (2020.02); *B60W 2556/40* (2020.02); *B60W 2720/10* (2013.01)

(56) References Cited

U.S. PATENT DOCUMENTS

| | | | |
|---|---|---|---|
| 9,885,578 | B2 | 2/2018 | Mizuno et al. |
| 10,611,366 | B2 | 4/2020 | Jundt et al. |
| 2005/0240334 | A1 | 10/2005 | Matsumoto et al. |
| 2015/0151756 | A1 | 6/2015 | Han |
| 2016/0096430 | A1 | 4/2016 | Park et al. |
| 2020/0139971 | A1* | 5/2020 | Bucht ............ B60W 30/18145 |
| 2020/0180617 | A1* | 6/2020 | Tezuka ................. B60W 30/14 |
| 2020/0346659 | A1 | 11/2020 | Düser et al. |
| 2020/0385005 | A1* | 12/2020 | Gao ....................... B60W 50/00 |
| 2020/0385007 | A1* | 12/2020 | Bucht ................... B60W 40/09 |
| 2021/0114620 | A1* | 4/2021 | Yu ....................... B60W 30/162 |
| 2021/0245733 | A1* | 8/2021 | Flumeri ................ B60W 40/08 |
| 2022/0009487 | A1* | 1/2022 | Belle .................. B60W 30/146 |

FOREIGN PATENT DOCUMENTS

| | | |
|---|---|---|
| DE | 102004040351 A1 | 3/2006 |
| DE | 102006006365 A1 | 8/2007 |
| DE | 102009000397 A1 | 7/2010 |
| DE | 102009023489 A1 | 12/2010 |
| DE | 102011006741 A1 | 10/2012 |
| DE | 102015013143 A1 | 4/2017 |
| DE | 102016216156 B3 | 2/2018 |
| DE | 102018210495 A1 | 1/2020 |
| DE | 112014002019 B4 | 3/2020 |
| DE | 102018222227 A1 | 6/2020 |
| DE | 102019200541 A1 | 7/2020 |
| JP | H10269495 A | 10/1998 |
| WO | 2015178839 A1 | 11/2015 |

OTHER PUBLICATIONS

Office Action created Apr. 20, 2022 in related/corresponding DE Application No. 10 2021 003 873.8.

Office Action dated Aug. 26, 2024 in related/corresponding JP Application No. 2024-504923.

* cited by examiner

METHOD FOR LIMITING A DRIVING SPEED OF A VEHICLE WHEN DRIVING AROUND A BEND

BACKGROUND AND SUMMARY OF THE INVENTION

Exemplary embodiments of the invention relate to a method for limiting a driving speed of a vehicle when driving around a bend.

There are many approaches in the literature for determining optimal positions of recommended speeds when driving around bends, which however reflect reality poorly or insufficiently. Frequently, a complex bend course with only a single speed limit is considered. Consequently, the automated and predictive driving speed control system will frequently adjust the speed at the wrong time (or at the wrong position) when driving around bends.

DE 10 2006 006 365 A1 describes a device and a method for controlling the longitudinal movement of a vehicle, in which environment data and/or route data is recorded and is used as a basis to influence the vehicle on a route depending on its position. A curve course of the route and a maximum speed profile dependent thereon are determined in advance, the maximum speed profile is corrected in order to match physical load limits of the vehicle, and a speed limit is imposed on the basis of the corrected maximum speed profile.

DE 10 2009 023 489 A1 describes a method and a device for controlling the speed of a vehicle. Using digital map data, a maximum speed profile dependent on the route portion lying ahead is determined. Furthermore, the speed of the vehicle is limited depending on the determined maximum speed profile, such that a pre-determined limit speed is not fallen short of, even if the latter is greater than a speed of the maximum speed profile.

Exemplary embodiments of the invention are directed to an improved method for limiting a driving speed of a vehicle when driving around a bend.

In a method according to the invention for limiting a driving speed of a vehicle when driving around a bend, a course of a curve of a route portion lying ahead of the vehicle is determined, in particular by means of a digital map and/or using data of a sensor for recording the environment, wherein depending on the course of the curve and on physical load limits of the vehicle, a course of a permissible bend speed is determined, and the vehicle is controlled such that the determined permissible bend speeds are not exceeded when driving around the bend. According to the invention, by evaluating the course of the curve, a route portion in which the curve is larger than a pre-determined curve limit is identified as a bend portion, wherein local curve maxima are identified in the identified bend portion, and wherein when several local curve maxima are identified in the bend portion, a permissible bend speed is determined for each local curve maximum depending on the curve and on a permissible lateral acceleration.

The invention presently described sets the relevant bend speed at the relevant position within the bend and, if necessary, also several speed limits. Speed control systems can thus function precisely and reliably.

In one embodiment, the permissible lateral acceleration is pre-determined depending on the curve, in particular as a characteristic curve or look-up table.

In one embodiment, the identified bend portion is subdivided into several bend sections bordering each other, wherein borders are formed between neighboring bend sections by the local curve maxima.

In one embodiment, deviations between the permissible bend speeds at the beginning and end of a respective bend section are determined, wherein if the determined deviation exceeds a pre-determined speed threshold, at least one further permissible bend speed is determined by interpolation, in particular by linear interpolation, in the respective bend section on the basis of the permissible bend speeds at the beginning and end of the respective bend section.

In one embodiment, a number of determined further permissible bend speeds is selected to be larger the larger the determined deviation between the permissible bend speeds at the start and at the end of the respective bend section.

In one embodiment, a respective position relative to the at least one further permissible bend speed is determined by determining the associated curve and determining an exact position of the additional speed limit via linear interpolation between two curve values.

In one embodiment, a characteristic curve or look-up table is used to determine the permissible lateral acceleration depending on the speed.

In one embodiment, a follow-up investigation is carried out for the necessity of the additional speed limit on the basis of the acceleration process, wherein the additional speed limit is not required if the acceleration required to reach the speed limit at a following curve maximum exceeds an adjustable acceleration limit which is or can be pre-determined.

Exemplary embodiments of the invention are explained in more detail in the following with reference to drawings.

BRIEF DESCRIPTION OF THE DRAWING FIGURES

Here:

Parts corresponding to one another are provided with the same reference numerals in all Figures.

DETAILED DESCRIPTION

Exemplary embodiments of the invention relate to a method for limiting a driving speed of a vehicle when driving around a bend K.

According to the invention, a curve course of a route portion ahead of the vehicle is determined, in particular using a digital map. By evaluating the curve course, a road portion, in which a curve κ, also described as a bend curve κ, is greater than a pre-determined curve limit value $κ_{lim}$, is identified as a bend portion. Curve κ is here understood to mean the magnitude of the curve, i.e., any sign specifying the direction of the curve, and thus specifies whether the curve is a curve to the left or to the right, is not taken into account. Local curve maxima, k2, k6, k8, k12 are identified in the identified bend portion. For each local maximum, a permissible bend speed v is determined depending on the curve κ and depending on a permissible lateral acceleration.

The vehicle is controlled such that the determined permissible bend speeds v are not exceeded when driving around the bend K.

Figure 1:
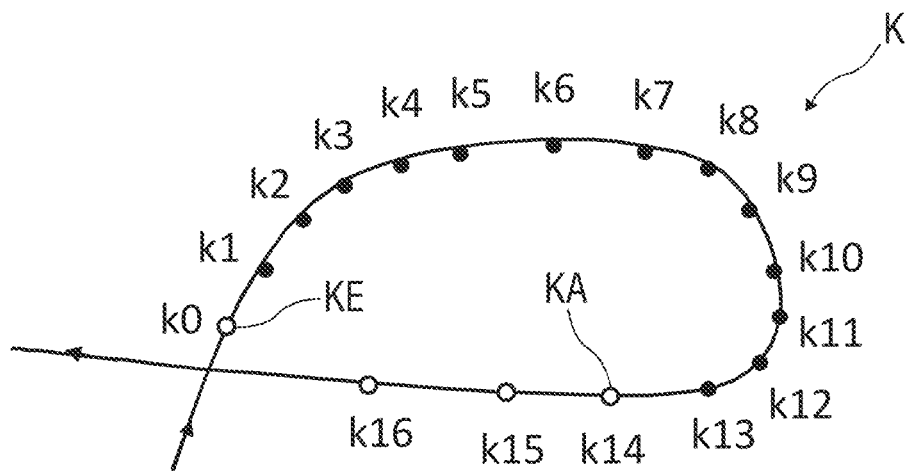
FIG. 1 shows a schematic view of a bend.

FIG. 1 is a schematic view of a bend K.

The bend K is, for example, divided into regions k1 to k16, with a bend entry KE and a bend exit KA, which have a curve κ greater than a curve threshold $\kappa_{lim}$ in a curve direction. In FIG. 1, the bend entry KE is the region k0 ahead of a bend K with a smaller curve κ than the curve threshold $\kappa_{lim}$. In FIG. 1, the bend exit KA is the region k14 after the bend K with a smaller curve κ than the curve threshold $\kappa_{lim}$.

Figure 2:
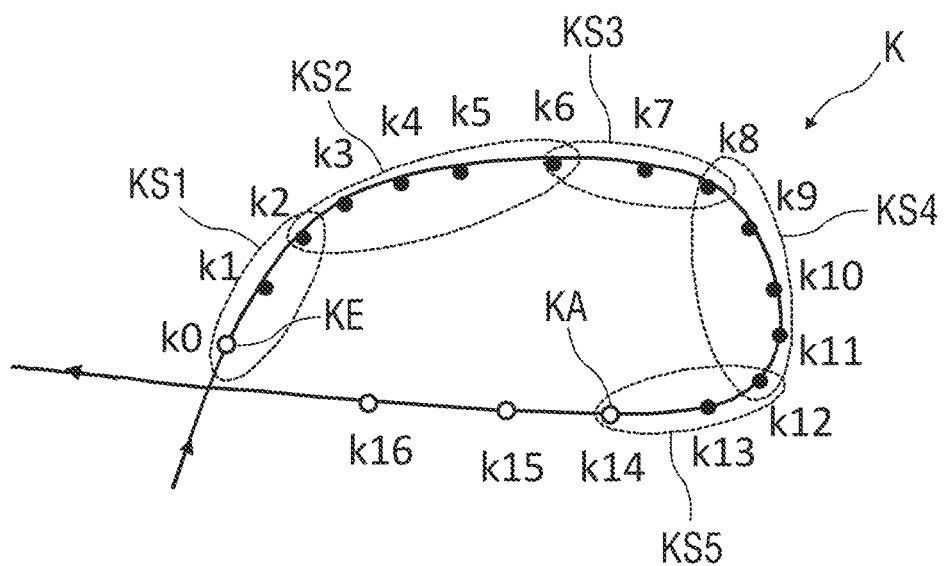
FIG. 2 shows a schematic view of the bend, which is divided into bend sections.

FIG. 2 is a schematic view of the bend K, which is divided into bend sections KS1 to KS5.

Between the bend entry KE and the bend exit KA, the bend K can be further divided into bend sections KS1 to KS5, which respectively have a section beginning and a section end.

A start section KS1 begins at the bend entry KE, in FIG. 2 the region k0, and extends up to a following bend curve maximum, in FIG. 2 the region k2. An end section KS5 ends at the bend exit, in FIG. 2 the region k14, and begins at the last bend curve maximum, in FIG. 2 the region k12.

One or more middle sections KS2 to KS4 can be located between the start section KS1 and the end section KS5. The middle sections KS2 to KS4 respectively begin at a bend curve maximum, in FIG. 2 respectively at the region k2, k6 and k8, and extend up to a following bend curve maximum, in FIG. 2 the regions k6, k8 and k12.

In other embodiments, another number of bend sections KS1 to KSn can be provided.

Several bend sections KS1 to KSn can thus be created in the same direction.

In one embodiment, the bend entry KE is not given a speed limit $v_{zul}$.

The first speed limit within the first bend section KS1 (regions k0 to k2) can be located at the position of the first curve maximum (region k2) or at a position of additional speed limits $v_{zul}$.

Within a bend section KS1 to Ksn, at least one curve maximum, but a maximum of two curve maxima, can be contained.

The speed limits $v_{per}$ can be determined based on the following formula correlation at all curve maxima:

$$v_{per}[km/h] = 3.6 \cdot \sqrt{a_{lat_{per}}(\kappa) \cdot \frac{1}{\kappa}} \qquad (1)$$

A permissible lateral acceleration $a_{lat_{per}}(\kappa)$ can be made available as a characteristic curve KL1 depending on a bend curve κ.

Figure 3:
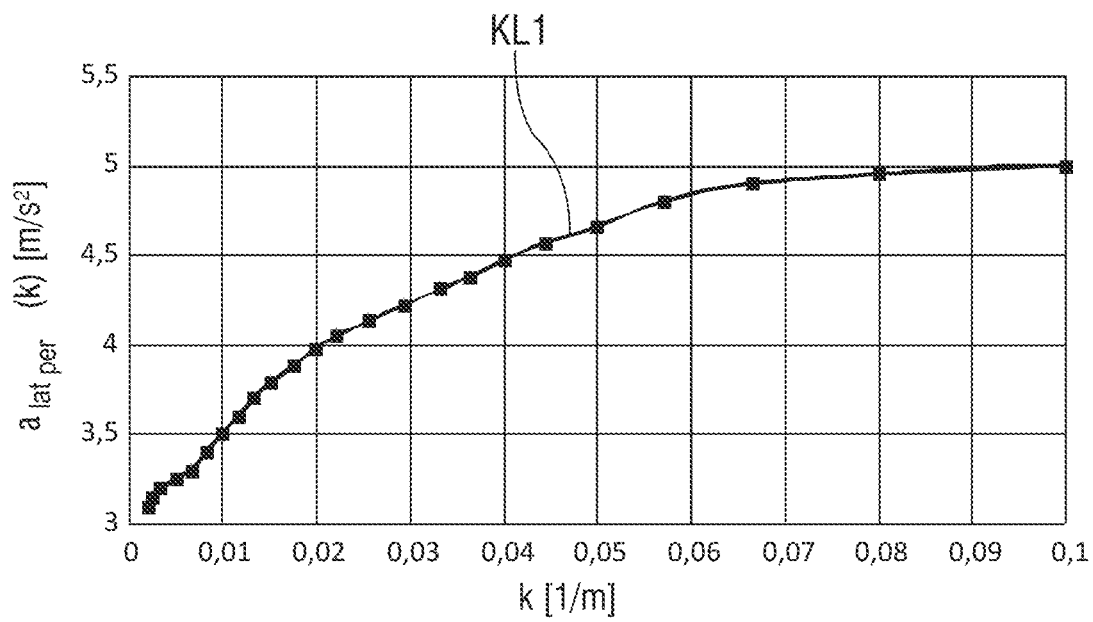
FIG. 3 shows a schematic view of a characteristic curve of a permissible lateral acceleration depending on a bend curve.

FIG. 3 is a schematic view of the characteristic curve KL1.

Within the characteristic curve KL1, linear interpolation is possible between its grid points.

For example, the characteristic curve KL1 can have the following grid points:

| $\kappa \left[\frac{1}{m}\right]$ | $a_{lat_{per}}(\kappa)\left[\frac{m}{s^2}\right]$ |
|---|---|
| 1 | 5 |
| 0.1 | 5 |
| 0.06 | 4.9 |
| 0.05 | 4.6 |
| 0.03 | 4.3 |

-continued

| $\kappa \left[\frac{1}{m}\right]$ | $a_{lat_{per}}(\kappa)\left[\frac{m}{s^2}\right]$ |
|---|---|
| 0.025 | 4.1 |
| 0.02 | 4 |
| 0.013 | 3.7 |
| 0.01 | 3.5 |
| 0.006 | 3.3 |
| 0.005 | 3.25 |
| 0.003 | 3.2 |
| 0.0025 | 3.2 |
| 0.002 | 3.2 |

The speed limits $v_{per}$ at the curve maxima can be determined as follows.

If the bend section KS1 to KSn in question begins with a curve maximum, then any following curve maximum should be omitted if the required acceleration falls short of an adjustable limit which is or can be pre-determined (i.e., the speed limit $v_{zul}$ of the following maximum is close to the previous maximum in terms of magnitude).

The speed limit $v_{per}$ of the following maximum is not required if:

$$a_{long} = \frac{v_i + v_{i+1}}{2} \cdot \frac{|v_{i+1} - v_i|}{\Delta s} a_{long} < a_{Limit_1} \qquad (2)$$

$a_{long}$ longitudinal acceleration $a_{Limit_1}$ limit of the acceleration i index corresponding to the index of the region k1 to kn s route $v_i$ speed The speed limits $v_{per}$ (position of the legal speed limit $v_{legal}$) at the bend exit KA is determined as follows:

If the bend section KS1 to KSn in question ends with the bend end KE (i.e., the curve κ falls short of an adjustable curve limit which is or can be pre-determined), then the position before the bend end KE is determined at which the curve κ corresponds to the current speed limit $v_{per}$. This position is the desired bend end KE. The position is calculated according to:

$$\Delta s = f(\kappa); \qquad (3)$$

$$\kappa = f(v_{legal}) \qquad (4)$$

The connection between the bend curve κ and the legal speed limit $v_{legal}$ can be stored in a characteristic curve or look-up table.

$$\kappa = \frac{a_{lat_{per}}(v_{legal})}{\left(\frac{v_{legal}}{3.6}\right)^2} \qquad (5)$$

The connection between the permissible lateral acceleration $\alpha_{lat_{per}}$ and the legal speed limit $v_{legal}$ can be stored in a characteristic curve or look-up table.

$$\Delta s = s_{i+1} - s_i \cdot \frac{\kappa - \kappa_i}{\kappa_{i+1} - \kappa_i} \qquad (6)$$

$$s = s_i + \Delta s \qquad (7)$$

$v_{legal}$ legal speed limit

For example, $$\Delta s = s_{14} - s_{13} \cdot \frac{\kappa - \kappa_{13}}{\kappa_{14} - \kappa_{13}} \qquad (8)$$

applies.

The bend end KE is characterized in the application, for example with the highest value, for example 255, of a range of numbers of a particular bit width, for example 8 bits, which can denote a state in which no data is available. The legal speed limit $v_{legal}$ can only be driven at again at the bend end KE.

The calculation of additional speed limits can be carried out within individual bend sections KS1 to KSn as follows:

An absolute speed difference $\Delta v$ between the beginning of the bend section and the end of the bend section is taken into account, and is compared with speed difference parameters $v_{P1}$, $v_{P2}$.

In a case a) $\Delta v < v_{P1}$, applies, in this case no additional speed limit is set.

In a case b) $\Delta v > v_{P1}$ applies, in this case an additional speed limit is set at the position which corresponds to $$\frac{\Delta v}{2}.$$

In a case c) $\Delta v > v_{P2}$ applies, in this case two additional speed limits are set at the positions which correspond to $$\frac{\Delta v}{3} \text{ and } \frac{2\Delta v}{3}.$$

Figure 4:
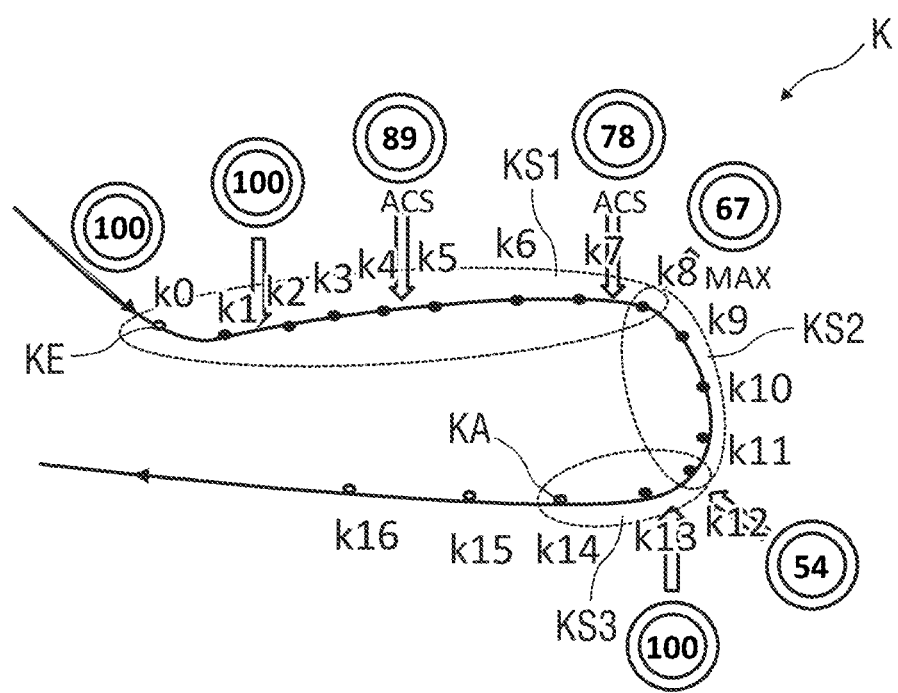
FIG. 4 shows a schematic view of a bend, which is divided into bend sections.

FIG. 4 is a schematic view of a bend K, which is divided into bend sections KS1 to KS3.

A start section KS1 begins at the bend entry KE, in FIG. 4 the region k0, and extends up to a following bend curve maximum, in FIG. 4 the region k8. An end section KS3 ends at the bend exit KA, in FIG. 4 the region k14, and begins at the last bend curve maximum, in FIG. 4 the region k12.

A middle section KS2 is located between the start section KS1 and the end section KS3. The middle section KS2 begins at a bend curve maximum, in FIG. 4 at the region k8, and extends up to a following bend curve maximum, in FIG. 4 the region k12. At the beginning of the start section KS1, a speed limit of 100 km/h is set. At the end of the start section KS1, a speed limit of 67 km/h is set. The absolute speed difference $\Delta v$ between the beginning of the start section KS1 and the end of the start section KS1 is 33 km/h. In the example shown, the speed difference parameters $v_{P1}$, $v_{P2}$ are set as follows:

$v_{P2} = 30$ km/h, $v_{P1} = 20$ km/h.

A first additional speed limit is then $v_{ACS1}=100-33/3=89$ km/h. A second additional speed limit is $v_{ACS2}=100-2*33/3=78$ km/h.

Furthermore, the associated positions can be determined relative to the additional speed limits. For this purpose, the associated bend curves can be determined relative to the additional speed limits.

The exact position of the additional speed limit is, for example, determined by linear interpolation between two curve values. A characteristic curve for determining the permissible lateral acceleration $\alpha_{lat_{per}}$ depending on the speed v can be used.

Figure 5:
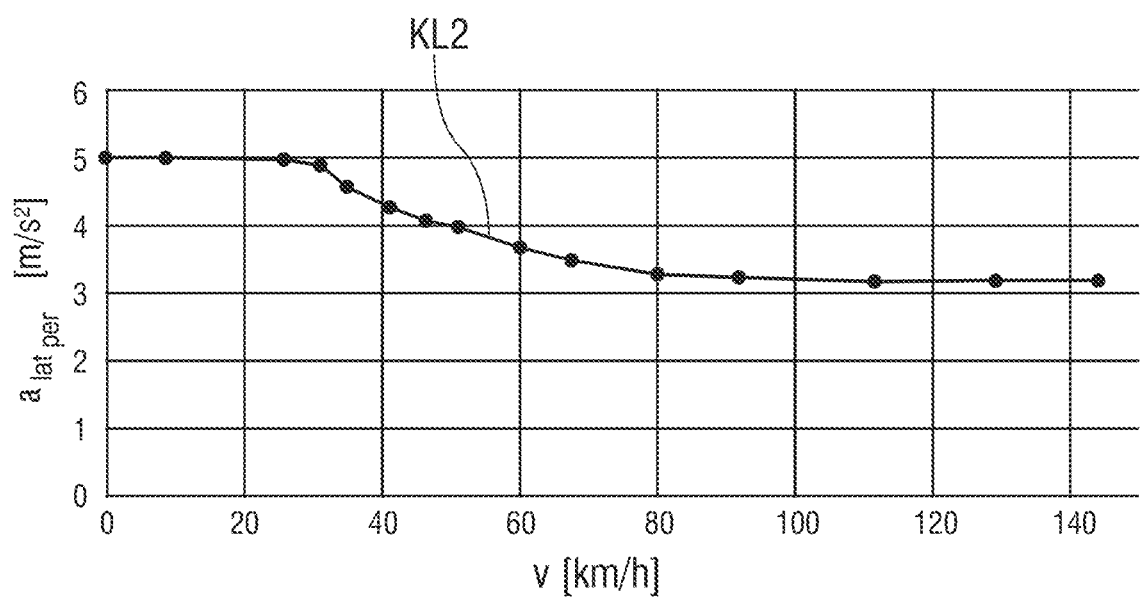
FIG. 5 shows a schematic view of a characteristic curve of a permissible lateral acceleration depending on a speed.

FIG. 5 is a schematic view of the characteristic curve KL2.

For example, the characteristic curve KL2 can have the following grid points:

| $v\left[\frac{km}{h}\right]$ | $a_{lat_{per}}\left[\frac{m}{s^2}\right]$ |
|---|---|
| 8 | 5 |
| 25 | 5 |
| 30.9 | 4.9 |
| 34.5 | 4.6 |
| 40.9 | 4.3 |
| 46.1 | 4.1 |
| 50.9 | 4 |
| 60 | 3.7 |
| 67.3 | 3.5 |
| 80 | 3.3 |
| 91.8 | 3.25 |
| 111.5 | 3.2 |
| 128.8 | 3.2 |
| 144 | 3.2 |

$$\kappa = \frac{a_{lat_{per}}(\bar{v})}{\left(\frac{\bar{v}}{3.6}\right)^2} \text{ with } \bar{v} = (v_{i+1} + v_i)/2 \qquad (9)$$

$$\Delta s = f(\kappa); \kappa = \text{characteristic curve}\left(\frac{\Delta v}{3} \text{ or } \frac{2\Delta v}{3}\right) \qquad (10)$$

$$\Delta s = s_{i+1} - s_i \cdot \frac{\kappa - \kappa_i}{\kappa_{i+1} - \kappa_i} \qquad (11)$$

$$s = s_i + \Delta s \qquad (12)$$

$\bar{v}$ average speed

A subsequent investigation of the necessity for the additional speed limit can take place on the basis of the acceleration process. The additional speed limit is not required, for example, if the acceleration required to reach the speed limit $v_{per}$ at the following curve maximum exceeds an adjustable acceleration limit which is or can be pre-determined (i.e., the additional speed limit differs too much from the following maximum, and is thus obsolete).

The additional speed limit is not required, for example, if the following applies:

$$a_{long} = \frac{v_i + v_{i+1}}{2} \cdot \frac{|v_{i+1} - v_i|}{\Delta s} \quad (13)$$

$$a_{long} > a_{Limit_2} \quad (14)$$

$\alpha_{Limit_2}$ limit of the acceleration

The limits of the acceleration $\alpha_{Limit_1}$ and $\alpha_{Limit_2}$ can be pre-determined such that they are different or the same.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for limiting a driving speed of a vehicle when driving around a bend, the method comprising:
    determining a course of a curve of a route portion lying ahead of the vehicle;
    determining, based on the course of the curve and on physical load limits of the vehicle, a course of a permissible bend speed; and
    controlling the vehicle such that the determined permissible bend speeds are not exceeded when driving around the bend,
    wherein, by evaluating the course of the curve, a route portion, in which the curve is greater than a pre-determined curve limit value, is identified as a bend portion,
    wherein local curve maxima are identified in the identified bend portion, and
    wherein, when several local curve maxima are identified in the bend portion, a permissible bend speed is determined for each local curve maximum depending on the curve and on a permissible lateral acceleration.

2. The method of claim 1, wherein the permissible lateral acceleration is predetermined depending on the curve.

3. The method of claim 2, wherein the permissible lateral acceleration is predetermined as a characteristic curve or look-up table depending on the curve.

4. The method of claim 1, wherein the identified bend portion is sub-divided into several bend sections bordering each other, wherein borders between neighbouring bend sections are formed by the local curve maxima.

5. The method of claim 1, wherein deviations between the permissible bend speeds at the beginning and end of a respective bend section are determined, wherein if the determined deviation exceeds a predetermined speed threshold, at least one further permissible bend speed is determined by interpolation in the respective bend section based on the permissible bend speeds at the beginning and end of the respective bend section.

6. The method of claim 5, wherein the interpolation is a linear interpolation.

7. The method of claim 5, wherein a number of determined further permissible bend speeds is selected to be larger the larger the determined deviation between the permissible bend speeds at the start and at the end of the respective bend section.

8. The method of claim 5, wherein a respective position relative to the at least one further permissible bend speed is determined by determining an associated curve and determining an exact position of an additional speed limit via linear interpolation between two curve values.

9. The method of claim 8, wherein a characteristic curve or look-up table is used to determine the permissible lateral acceleration depending on the speed.

10. The method of claim 5, wherein a follow-up investigation is performed as to whether the additional speed limit is necessary based on an acceleration process, wherein the additional speed limit is not required if acceleration required to reach the speed limit at a following curve maximum exceeds an adjustable acceleration limit which predetermined.

* * * * *